United States Patent
Rao et al.

[11] Patent Number: 6,090,310
[45] Date of Patent: Jul. 18, 2000

[54] GREEN EMITTING TB³⁺ ACTIVATED BORATE PHOSPHORS USED IN LOW PRESSURE MERCURY VAPOUR LAMPS AND A PROCESS FOR SYNTHESIZING THE SAME

[75] Inventors: Gundlapalli Venkata Subba Rao; Ramakrishnan Sankar, both of Karaikudi, India

[73] Assignee: Council of Scientific and Industrial Research, New Delhi, India

[21] Appl. No.: 09/262,746

[22] Filed: Mar. 5, 1999

[30] Foreign Application Priority Data

Jan. 12, 1999 [IN] India .................... 53/DEL/99

[51] Int. Cl.⁷ .................................................. C09K 11/63
[52] U.S. Cl. .................................................. 252/301.4 R
[58] Field of Search ........................ 252/301.4 R

[56] References Cited

U.S. PATENT DOCUMENTS 4,926,091  5/1990  Verlijsdonk et al. ............ 252/301.4 R
4,946,621  8/1990  Fouassier et al. ............... 252/301.4 R

*Primary Examiner*—C. Melissa Koslow
*Attorney, Agent, or Firm*—Lowe Hauptman Gopstein Gilman & Berner

[57] ABSTRACT

The present invention relates to novel green emitting $Tb^{3+}$ activated borate phosphors having the formula $A_6M_{1-x}Tb_xM'(BO_3)_6$ wherein A=Sr; M=Y, Gd; M'=Sc, Y, Gd, Al, Ga; and $0.02 \leq x \leq 1$, and a process for the synthesis of such activated borate phosphors.

9 Claims, 2 Drawing Sheets

GREEN EMITTING TB³⁺ ACTIVATED BORATE PHOSPHORS USED IN LOW PRESSURE MERCURY VAPOUR LAMPS AND A PROCESS FOR SYNTHESIZING THE SAME

FIELD OF THE INVENTION

The present invention relates novel green emitting $Tb^{3+}$ activated borate phosphors having the formula $A_6M_{1-x}Tb_xM'(BO_3)_6$ wherein A=Sr; M=Y, Gd; M'=Sc, Y, Gd, Al, Ga; and $0.02 \leq x \leq 1$ which are used in low pressure mercury vapour lamps, and a process for the synthesis of such green emitting $Tb^{3+}$ activated borate phosphors.

Background

High efficiency tricolor (trichromatic) fluorescent lamps based on rare-earth phosphors contain a blend of three different inorganic compounds each emitting in different regions viz., blue (450 nm), green (540 nm) and red (610 nm) which mixes upon and gives out white light when excited by mercury discharge at low pressure corresponding to radiation of wavelength 254 nm. The requirements of these components for use in low pressure mercury vapour (lpmv) lamps are mainly strong emission in the required regions when excited with 254 nm wavelength and thus strong absorption of 254 nm radiation. In addition, it must be easily synthesizeable and must be stable i.e. the inorganic dopant(s) present in the phosphor should not undergo any change in its valence state when heated to high temperatures $\geq 600°$ C., one of the essential conditions required during the process of lamp manufacturing (baking), and the phosphor should not degrade at ordinary and at high temperatures ($\geq 900°$ C.). Hitherto, the green components have been either lanthanum orthophosphate ($LaPO_4$) co-doped with the rare-earths cerium ($Ce^{3+}$) and terbium ($Tb^{3+}$) or cerium magnesium aluminate ($CeMgAl_{11}O_{19}$) doped with terbium ($Tb^{3+}$) or gadolinium magnesium pentaborate ($GdMgB_5O_{10}$) co-doped with $Ce^{3+}$ and $Tb^{3+}$. Eventhough, these phosphors emit in the required region with high intensity, lanthanum orthophosphate and cerium magnesium aluminate require high temperatures. ($\geq 1200°$ C.) for their synthesis. In addition, the presence of $Ce^{3+}$ in all these components makes them unstable if heated in air to high temperatures by reaching a different oxidation state, for example, $Ce^{4+}$.

OBJECTS OF THE INVENTION

The main object of the present invention is to provide new green emitting $Tb^{3+}$ activated borate phosphors for use in low pressure mercury vapour lamps and a process for the synthesis of the same, obviating the drawbacks as detailed above. Another object of the invention is to provide a process which can be conducted at lower temperatures than those required for the synthesis of the existing commercial green phosphors ($LaCePO_4$:Tb, $CeMgAl_{11}O_{19}$:Tb).

It is a further object of the invention to provide $Tb^{3+}$ activated borate phosphors which are stable in air even when heated to high temperatures ($\geq 900°$ C.).

The above objectives may be accomplished, by using new borate phosphors of the form $A_6M_{1-x}Tb_xM'(BO_3)_6$ based on the crystal structure of the $A_6MM'(BO_3)_6$ compounds with a Rhombohedral-hexagonal structure. In these compounds, so far no attempts have been made to study the $Tb^{3+}$ luminescence properties, though the skeletal structure is reported in K. I. Schaffers etal.(J.Am.Chem.Soc., 112 (1990) 7068; Chem.Mater., 6 (1994) 2014).

DETAILED DESCRIPTION OF THE INVENTION

Figure 1:
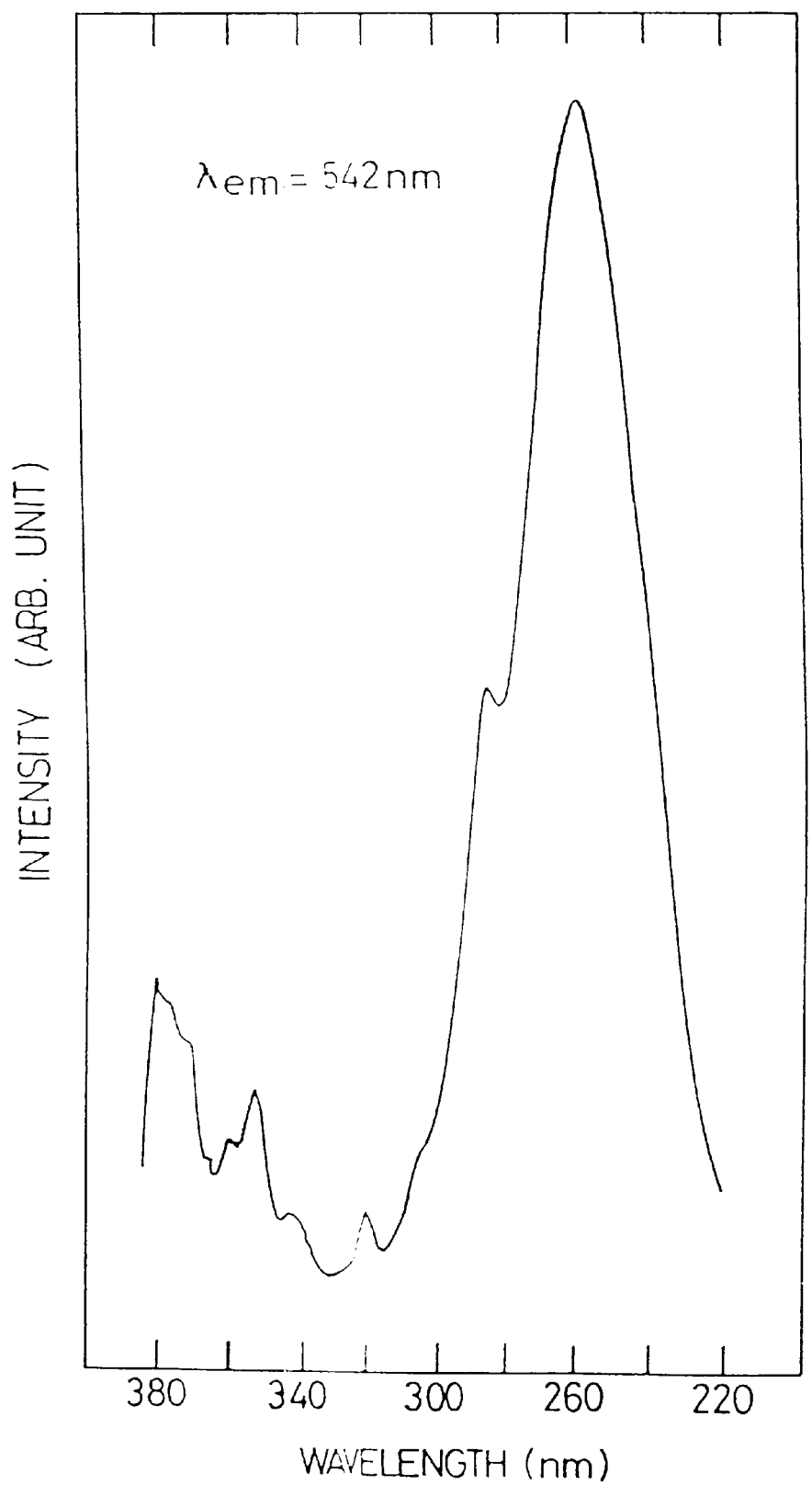

Accordingly, the present invention provides new green emitting $Tb^{3+}$ activated borate phosphors having the formula $A_6M_{1-x}Tb_xM'(BO_3)_6$ wherein A=Sr; M=Y. Gd; M'=Sc, Y, Gd, Al, Ga; and $0.02 \leq x \leq 1$, the invention also provides a process for the synthesis of the said phosphors by the solid state reaction using at least four of the ingredients from the group consisting of $SrCO_3$, $Y_2O_3$ and/or $Gd_2O_3$, $Sc_2O_3$ or $Al_2O_3$ or [$Al(NO_3)_3.9H_2O$] or $Ga_2O_3$, $Tb_4O_7$ and $H_3BO_3$ comprising the following step,: (i) mixing and grinding of the ingredients selected in suitable proportions for about 15–45 minutes in an agate mortar with or without acetone and (ii) subjecting the ground ingredients to a heat treatment at temperatures ranging from 800–1050° C. for a period ranging from 5–30 hours, u reducing atmosphere, to obtain the desired phosphors useful as green components in low pressure mercury vapour lamps, when excited with UV radiation of wavelength 254 nm.

In an embodiment of the invention, synthesis of borate phosphors is carried out under reducing atmosphere created using either activated charcoal or $H_2$ or $N_2$:$H_2$ gas flow.

In another embodiment, the synthesized borate phosphors have particle sizes in the range 5–15 $\mu$m.

In another embodiment, the synthesized borate phosphors show intense green emission in the region $\lambda$=542 nm.

In another embodiment, synthesized borate phosphors are stable when heated in air to high temperatures.

In another embodiment, synthesized borate phosphors are directly excited with radiation of wavelength 254 nm.

In an embodiment of the invention, the proportion of the ingredients $SrCo_3$ is 5.2–6.5 mole, $Y_2O_3$, $Gd_2O_3$, is 0.005–1.1 mole, $Sc_2O_3$, $Al_2O_3$, $Ga_2O_3$ is 0.45–0.55 mole, $H_3BO_3$=5.0–7.0 mole, $Tb_4O_7$=0.005–0.25 mole.

In yet another embodiment, new borate phosphors was synthesized by solid state reaction between $SrCO_3$, $Ln_2O_3$ (Ln=Y, Gd), $M_2O_3$ (M=Sc, Al, Ga), $Tb_4O_7$ and $H_3BO_3$ at about 800–1050° C. under reducing atmosphere. Since the dopant terbium was required to yield the necessary luminescence by undergoing excitation-emission processes, it was added as oxide along with the other raw materials. The X-ray phase of these compounds was confirmed from powder X-ray data. The average particle size of these compounds was found to be in the range of 7–28 $\mu$m. The average particle size of these compounds was reduced (5–15 mm) by thorough grinding of these powders (~15 gm) in a planetary ball mill for 1–3 hours and subjected to luminescence measurements. There were no significant increase or decrease in the luminescence emission intensities of those compounds. The compounds prepared by solid state reaction were not found to be affected by the method of cooling. Whether a slow cooling to room temperature or a quenching in air after heat treatment, these compounds were found to give the same emission wavelength as well as intensity. These compounds were stable to dispersion in aqueous solution. Suspensions were stirred for 30 minutes (2 gm powder in 100 ml water), filtered, dried (24 hours in an oven) and subjected to luminescence studies. There were no appreciable changes in the observed luminescence emission intensities of these compounds.

The stability of $Tb^{3+}$ in air at high temperatures, in these compounds, is checked by heating them in air at high temperatures ($\geq 900°$ C.), then cooling to room temperature and measuring the luminescence emission intensity. The resultant compounds showed no change in their body color as well as in their luminescence emission intensities.

BRIEF DESCRIPTION OF THE ACCOMPANYING DRAWINGS

FIG. 1 represents the excitation band for the compound $Sr_6Y_{1.4}Tb_{0.6}(BO_3)_6$=when $\lambda em=542$ nm.

Figure 2:
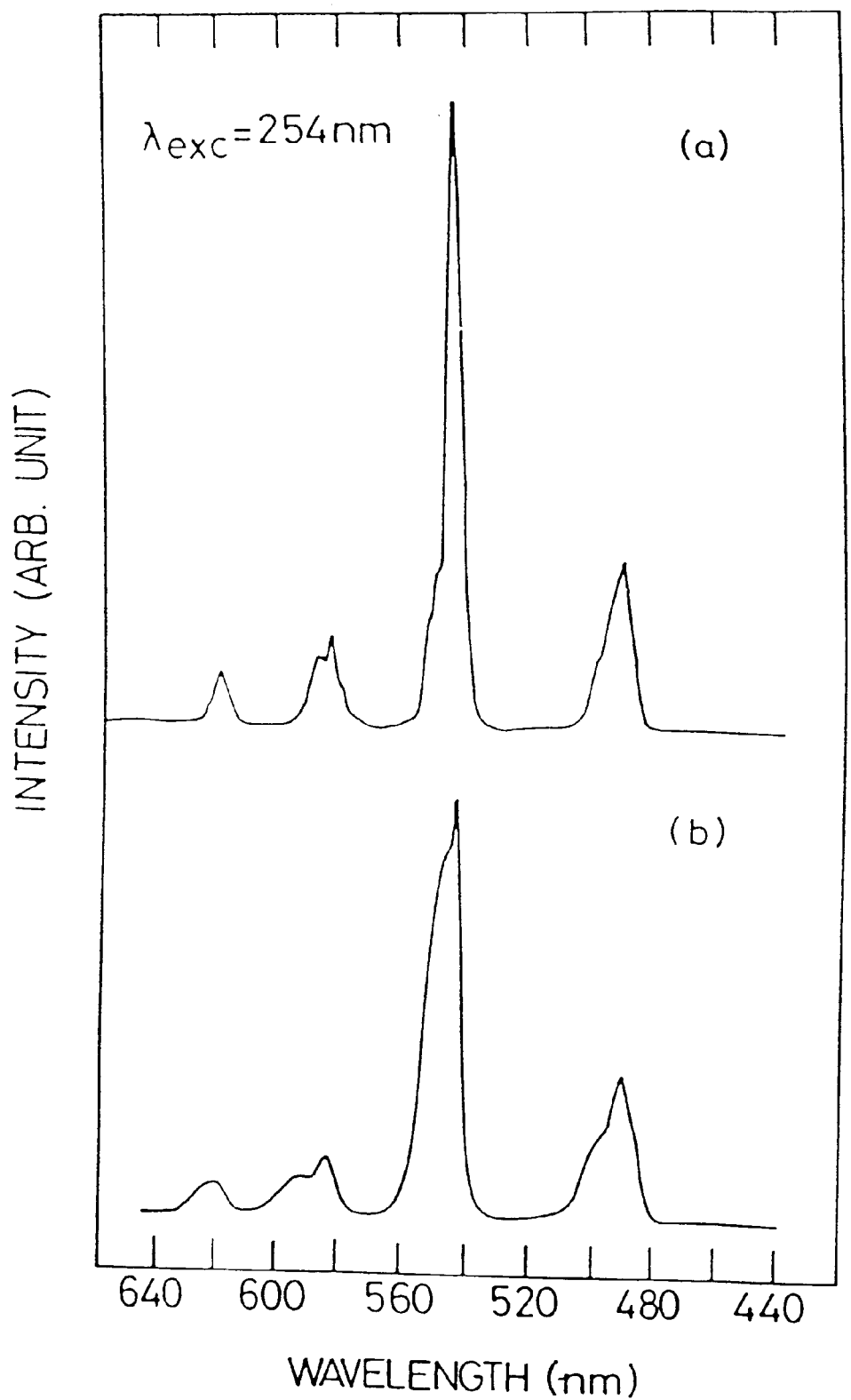

FIG. 2. represents a comparison of the excitation bands of commercial standard phosphors with the phosphors of the present invention ($\lambda exc=245$ nm).

When scanned for excitation by keeping the emission maximum ($l_{em}$) at 542 nm, the excitation band is found to be situated at 257 nm, as shown in FIG. 1 of the drawings accompanying this specification for a particular composition I which corresponds to $Sr_6Y_{1.4}Tb_{0.6}(BO_3)_6$(A=Sr; M=M'= Y; and x=0.6), requiring no sensitizer(s) to activate $Tb^{3+}$ in these compounds. When excited with radiation of wavelength 254 nm ($l_{exc}$), these materials are found to emit in the required region (542 $\lambda$nm) with high intensities, as shown in FIG. 2(b) of the drawings accompanying this specification for composition I. Proper comparison is made with the standard commercial phosphor $LaCePO_4$:Tb (obtained from Nichia Co., Japan) and the compounds of the invention are found to emit in the same region as that of the standard phosphor $LaCePO_4$:Tb [FIG. 2(a) of the drawings accompanying this specification]. The integrated emission intensities of these compounds as measured by keeping the emission wavelength zero ($l_{em}$=0), shows [when compared with the standard compound $LaCePO_4$:Tb (Nichia, Japan)] that, the integrated intensities of our compounds come to about 65–75% of the integrated intensity of the standard. The integrated emission intensity of the compounds with Y and/or Gd at the M' site is higher than in the compounds formed with Sc, Al, or Ga at the M' site when excited with radiation of wavelength 254 nm (for a given value of x of Tb).

The following Examples are given by way of illustrations of the present invention and the these should not be construed to limit the scope of the present invention.

EXAMPLE 1

In an experiment, 0.738 gm (0.005 mole) of $SrCO_3$ is mixed with 0.309 gm (0.00493 mole) of $H_3BO_3$, 0.178 gm (0.000788 mole) of $Y_2O_3$ and 0.015 gm (0.00002 mole) of $Tb_4O_7$ in an agate mortar, ground thoroughly with acetone and allowed to dry in air. The mixture is then kept inside in an alumina crucible (20 ml capacity) over which ashless filter paper is placed so as to cover the sample fully. This crucible is then placed inside a big alumina crucible (75 ml or 100 ml capacity) containing at the bottom 23 gm of activated charcoal. This will ensure a non-oxidizing atmosphere in the crucible. The big crucible is then covered with a lid and placed inside a muffle furnace. The furnace is then set to reach 1000° C. and kept at 1000° C. for 6 hours. The sample is then cooled inside the furnace to room temperature by furnace shut off. The final product, a white powder, is found to have a density of 4.08 gm/cc against the theoretical value of 4.20 gm/cc corresponding to the formula $Sr_6Y_{1.9}Tb_{0.1}(BO_3)_6$. The experiments are repeated separately with $H_2$ as well as with $N_2$:$H_2$ (1:3, obtained by the decomposition of $NH_3$) gas flow as the non-oxidizing/reducing medium instead of activated charcoal. The results obtained showed that, the average particle size of these powders lie between 7–28 $\mu$m. The integrated emission intensity of this compound comes to about 22% of the integrated intensity of the standard ($LaCePO_4$:Tb).

In another experiment, 2.952 gm (0.02 mole) of $SrCO_3$ is mixed with 1.236 gm (0.02 mole) of $H_3BO_3$, 0.564 gm (0.0025 mole) of $Y_2O_3$ and 0.311 gm (0.000416 mole) of $Tb_4O_7$ in an agate mortar, ground thoroughly with acetone and allowed to dry in air. This is then subjected to a heat treatment as described above. The final product, a white powder, is found to have a weight of 3.53 gm against the theoretical weight of 3.64 gm corresponding to the formula $Sr_6Y_{1.5}Tb_{0.5}(BO_3)_6$. In addition, the experiments are repeated separately with $H_2$ as well as with $N_2$:$H_2$ (1:3) gas flow as the non-oxidizing/reducing medium instead of activated charcoal. Similarly, experiments are carried out separately with 0.906 gm (0.0025 mole) of $Gd_2O_3$ instead of $Y_2O_3$ corresponding to the formula $Sr_6Gd_{1.5}Tb_{0.5}(BO_3)_6$; and a combination of 0.604 gm (0.0017 mole) of $Gd_2O_3$, 0.188 gm (0.00084 mole) of $Y_2O_3$ and 0.311 gm (0.000416 mole) of $Tb_4O_7$ to give the compound $Sr_6GdY_{0.5}Tb_{0.5}(BO_3)_6$. The results obtained showed that, the average particle size of all these powders lie between 7–28 $\mu$m. The integrated emission intensities of the compounds (with M=M'=Y and/or Gd and x=0.5) come to about 65–75% of the intensity of the standard ($LaCePO_4$:Tb). The intensities of the peak observed at 542 nm comes to about 50–60% of the standard for all these compounds.

EXAMPLE 2

1.476 gm (0.01 mole) of $SrCO_3$ is mixed with 0.618 gm (0.01 mole) of $H_3BO_3$, 0.156 gm (0.00083 mole) of $Ga_2O_3$ and 0.311 gm (0.000416 mole) of $Tb_4O_7$ in an agate mortar, ground thoroughly with acetone and allowed to dry in air. This is then given a heat treatment at 1000° C. for 5 hours under reducing atmosphere as described in Example 1 above. Experiments are repeated separately with 0.085 gm (0.00083 mole) of $Al_2O_3$ as well as with 0.115 gm (0.00083 mole) of $Sc_2O_3$ instead of $Ga_2O_3$, following the procedure described in Example 1. These experiments resulted in compounds of the form $Sr_6TbM'(BO_3)_6$ (M'=Ga, Al, Sc; x=1.0). The integrated emission intensities come to around 50–60% of the standard.

The main advantages of the present invention are

1. The borate phosphors presently studied contain only $Tb^{3+}$ ion as the activator which substitutes part of the ion present at the M site in the formula $Sr_6MM'(BO_3)_6$ (where A=Sr; M=Y, Gd; M'=Sc, Y, Gd, Al, Ga). The $Tb^{3+}$ ion present in our compounds does not require any sensitizer (like $Ce^{3+}$). The $Tb^{3+}$ ion present in our compounds is stable and does not undergo any change in its valence state even when heated to temperatures $\geq 900°$ C. in air.

2. The borate phosphors presently studied can be synthesized at lower temperatures than those required for the existing commercial green phosphors [e.g., $La(CeTb)PO_4$, $Ce(Tb)MgAl_{11}O_{19}$].

What is claimed is:

1. Novel green emitting $Tb^{3+}$ activated borate phosphors having the formula $A_6M_{1-x}Tb_xM'(BO_3)_6$ wherein A=Sr; M=Y, Gd; M'=Sc, Y; Gd, Al, Ga; and $0.02 \leq x \leq 1$.

2. Novel borate phosphor as claimed in claim 1 wherein the proportion of the ingredients $SrCO_3$ is 5.2–6.5 mole, $Y_2O_3$, $Gd_2O_3$, is 0.005–1.1 mole, $Sc_2O_3$, $Al_2O_3$, $Ga_2O_3$ is 0.45–0.55 mole, $H_3BO_3$=5.0–7.0 mole, $Tb_4O_7$=0.005–0.25 mole.

3. A process for the synthesis of novel borate phosphor as claimed in claim 1 by the solid state reaction using at least four of the ingredients from the group consisting of $SrCO_3$ (5.2–6.5 mole); $Y_2O_3$ and/or $Gd_2O_3$ (.0.005–1.1 mole) ;$Sc_2O_3$ or $Al_2O_3$ or or $Ga_2O_3$ (0,45–0.55 mole); $Tb_4O_7$ (0.005–0.25 mole) and $H_3BO_3$(5.0 to 7.0 mole) comprising the following steps: (i) mixing and grinding of the ingredients selected in suitable proportions for about 15–45 minutes in an agate mortar with or without acetone and (ii) subjecting the ground ingredients to a heat treatment at temperatures ranging from 800–1050° C. for a period ranging from 5–30 hours, under reducing atmosphere, to obtain the desired phosphors useful as green components in low pressure mercury vapour lamps, when excited with UV radiation of wavelength 254 nm.

4. A process as claimed in claim 3 wherein synthesis of borate phosphors is carried out under reducing atmosphere created by using either activated charcoal or $H_2$ or $N_2:H_2$ gas flow.

5. A process as claimed in claim 2 wherein the synthesized borate phosphors have particle sizes in the range 5–15 $\mu$m.

6. A process as claimed in claim 3 wherein the synthesized borate phosphors show intense green emission in the region $\lambda$=542 nm.

7. A process as claimed in claim 3 wherein synthesized borate phosphors are stable when heated in air to high temperatures greater than 900° C.

8. A process as claimed in claim 3 wherein synthesized borate phosphors are directly excited with radiation of wavelength 254 nm.

9. A process as claimed in claim 3 wherein the $N_2:H_2$ gas flow is in the range 1:3.

* * * * *